(12) United States Patent
Cho et al.

(10) Patent No.: US 11,804,874 B2
(45) Date of Patent: Oct. 31, 2023

(54) METHOD AND APPARATUS FOR MAGNETIC FIELD COMMUNICATION

(71) Applicant: ELECTRONICS AND TELECOMMUNICATIONS RESEARCH INSTITUTE, Daejeon (KR)

(72) Inventors: In Kui Cho, Daejeon (KR); Jang Yeol Kim, Daejeon (KR); Jung Hoon Oh, Daejeon (KR); Jae Woo Lee, Daejeon (KR); Jae Ho Lee, Daejeon (KR); Hyun Joon Lee, Daejeon (KR); Sang Won Kim, Daejeon (KR); Seong Min Kim, Daejeon (KR); Jung Ick Moon, Daejeon (KR); Woo Jin Byun, Daejeon (KR); Je Hoon Yun, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/734,286

(22) Filed: May 2, 2022

(65) Prior Publication Data

US 2022/0360295 A1    Nov. 10, 2022

(30) Foreign Application Priority Data

May 3, 2021   (KR) .................. 10-2021-0057389
Apr. 15, 2022  (KR) .................. 10-2022-0046956

(51) Int. Cl.
*H04B 5/00* (2006.01)

(52) U.S. Cl.
CPC ......... *H04B 5/0031* (2013.01); *H04B 5/0081* (2013.01); *H04B 5/0087* (2013.01)

(58) Field of Classification Search
CPC ... H04B 5/0031; H04B 5/0081; H04B 5/0087
USPC ............................................................. 455/41.1
See application file for complete search history.

(56) References Cited

U.S. PATENT DOCUMENTS

| 8,188,744 B2 | 5/2012 | Lee et al. |
| 8,368,599 B2 | 2/2013 | Lim et al. |
| 10,608,339 B2 | 3/2020 | Lee et al. |
| 2015/0194740 A1 | 7/2015 | Ju |

(Continued)

FOREIGN PATENT DOCUMENTS

| JP | 5222904 B2 | 6/2013 |
| KR | 10-2013-0112233 A | 10/2013 |

(Continued)

*Primary Examiner* — Eugene Yun
(74) *Attorney, Agent, or Firm* — LRK PATENT LAW FIRM

(57) ABSTRACT

An antenna device for magnetic field communication may include: a first coil; a second coil; a third coil; a first capacitor connected to a 1-1 terminal of the first coil; a second capacitor connected to a 2-1 terminal of the second coil; a third capacitor connected to a 3-1 terminal of the third coil; and an input port including a first input terminal connected to a 1-2 terminal of the first coil, a 2-2 terminal of the second coil, and a 3-2 terminal of the third coil, and a second input terminal connected to the first capacitor, the second capacitor, and the third capacitor.

7 Claims, 20 Drawing Sheets

(56) References Cited

U.S. PATENT DOCUMENTS

2020/0348380 A1* 11/2020 Taracila ........... G01R 33/34007
2022/0375678 A1* 11/2022 Drofenik ............. H01F 27/2852

FOREIGN PATENT DOCUMENTS

KR   10-2014-0047603 A    4/2014
WO       2012150746 A1   11/2012

* cited by examiner

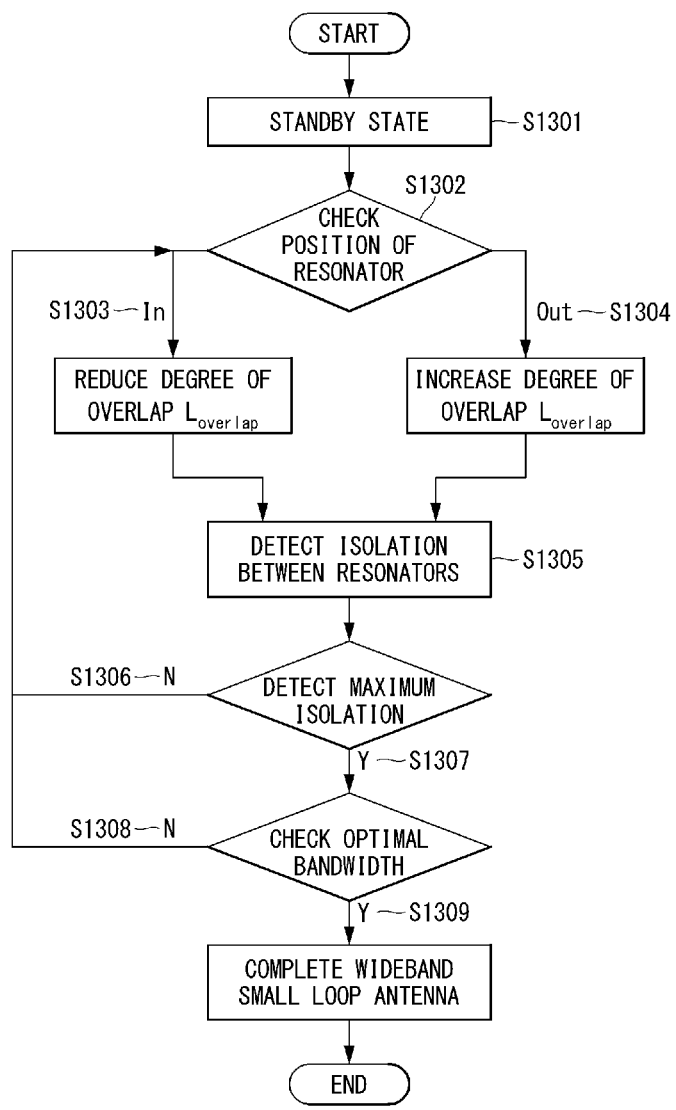

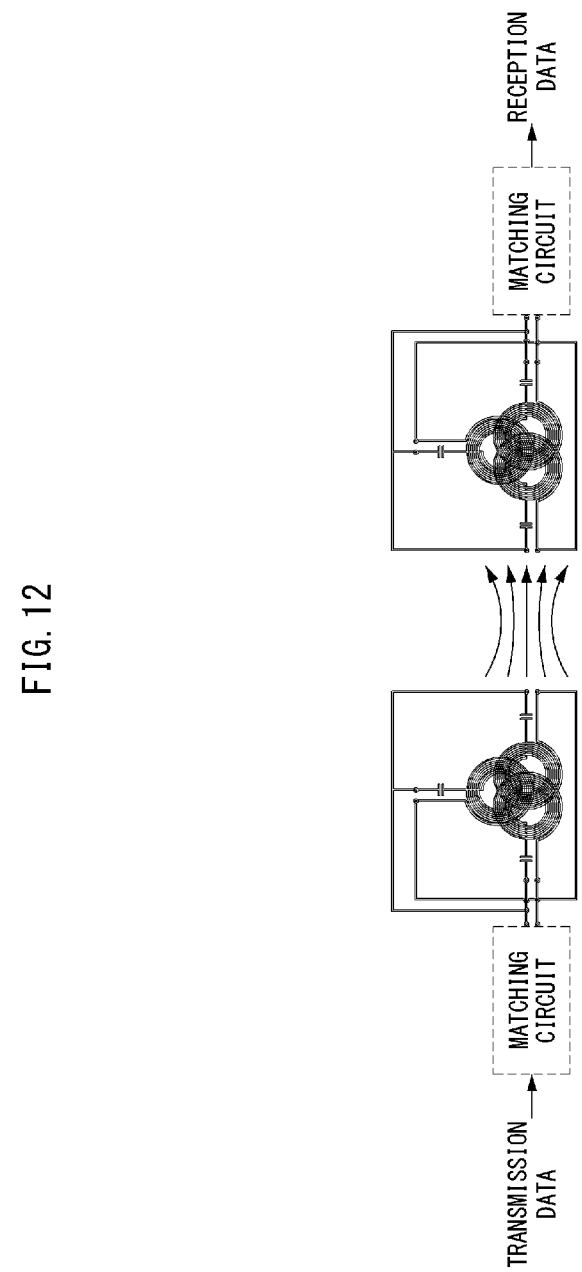

METHOD AND APPARATUS FOR MAGNETIC FIELD COMMUNICATION

CROSS-REFERENCE TO RELATED APPLICATIONS

This application claims priority to Korean Patent Applications No. 10-2021-0057389 filed on May 3, 2021 and No. 10-2022-0046956 filed on Apr. 15, 2022 with the Korean Intellectual Property Office (KIPO), the entire contents of which are hereby incorporated by reference.

BACKGROUND

1. Field of the Invention

Example embodiments of the present disclosure relate to a technology for magnetic field communication, and more specifically, to a broadband communication technology for increasing a transmission distance in magnetic field communication.

2. Description of Related Art

In order to wirelessly transmit more information in wireless communication, bandwidths of all modules or devices used for physical layers (e.g., antennas, transmission/reception filters, and amplifiers) belonging to a wireless channel may be the most important. For example, in order to transmit 10 Mbps information, in the case of amplitude shift keying (ASK) and binary phase shift keying (BPSK), a bandwidth of at least 10 MHz may be required.

Since a region where a magnetic field is dominant is a near field and thus a signal is rapidly attenuated as a transmission distance increases, magnetic field communication can be used only in a very close region. A representative example of magnetic field communication may be a near field communication (NFC) technology. In the case of the NFC technology, wireless communication can be performed at a close communication distance of 20 cm or less. In the NFC technology, an antenna coil may have a non-resonant structure using a magnetic induction technology without using a resonance phenomenon. Therefore, it is possible to secure a necessary bandwidth without difficulty, but a transmission distance may be very short. Magnetic induction-based super-proximity magnetic field communication can extend the transmission distance by securing a broadband through a loop coil of a resonance structure. Therefore, a method of solving a narrow band limitation of a small antenna may be needed.

SUMMARY

Accordingly, example embodiments of the present disclosure are provided to substantially obviate one or more problems due to limitations and disadvantages of the related art.

Example embodiments of the present disclosure provide a resonator configuration for overcoming a narrow band of a small antenna in which resonance occurs and provide a method and an apparatus for broadening a bandwidth using a plurality of resonant coils.

According to an exemplary embodiment of the present disclosure for achieving the above-described objective, an antenna device for magnetic field communication may comprise: a first coil; a second coil; a third coil; a first capacitor connected to a 1-1 terminal of the first coil; a second capacitor connected to a 2-1 terminal of the second coil; a third capacitor connected to a 3-1 terminal of the third coil; and an input port including a first input terminal connected to a 1-2 terminal of the first coil, a 2-2 terminal of the second coil, and a 3-2 terminal of the third coil, and a second input terminal connected to the first capacitor, the second capacitor, and the third capacitor, wherein the first coil and the first capacitor form a first resonator, the second coil and the second capacitor form a second resonator, the third coil and the third capacitor form a third resonator, the first to third coils are disposed to overlap each other, and isolation between the first to third resonators is determined according to a degree of overlaps between the first to third coils.

The overlaps between the first to third coils may be in a parallel form.

The first to third resonators may have different resonant frequencies.

The isolation between the first to third resonators may be determined according to inner diameters and thicknesses of the first to third coils.

The first to third resonators may be disposed such that the isolation between the first to third resonators becomes maximum and the degree of overlaps between the first to third resonators becomes maximum.

An input impedance of the input port may have any one value among 1 to 5 ohms.

Each of the first to third coils may have any one structure of a multilayer printed circuit board (PCB) or a stacked structure.

According to another exemplary embodiment of the present disclosure for achieving the above-described objective, an antenna setting method performed in an apparatus may comprise: adjusting a degree of overlaps between first to third coils; detecting isolation values between first to third resonators according to the degree of overlap; detecting a maximum value among the isolation values; checking whether a reflection coefficient value is increased to a first value in an arrangement of the first to third resonators having the maximum value; and when the reflection coefficient value does not rise to the first value, arranging the first to third resonators having the maximum value.

The first value may be 10 decibels (dB).

The overlaps between the first to third coils may be in a parallel form.

The first to third resonators may have different resonant frequencies.

The isolation values between the first to third resonators may be determined according to inner diameters and thicknesses of the first to third coils.

Each of the first to third coils may have any one structure of a multilayer printed circuit board (PCB) or a stacked structure.

According to the present disclosure, a resonant loop antenna can be miniaturized through resonators having different resonant frequencies, and a narrowband problem can be solved through the resonant loop antenna. In addition, since a broadband is secured, a transmission distance can be extended in near magnetic field communication in underwater or underground magnetic field communication environments. Accordingly, the performance of a magnetic field communication system can be improved.

BRIEF DESCRIPTION OF DRAWINGS

FIG. 11 is a flowchart illustrating an embodiment of a broadband small loop antenna design process for magnetic field communication.

FIG. 12 is a conceptual diagram illustrating an embodiment of medium and long-distance magnetic field communication using a wideband small loop antenna.

DETAILED DESCRIPTION OF THE EMBODIMENTS

Figure 1:
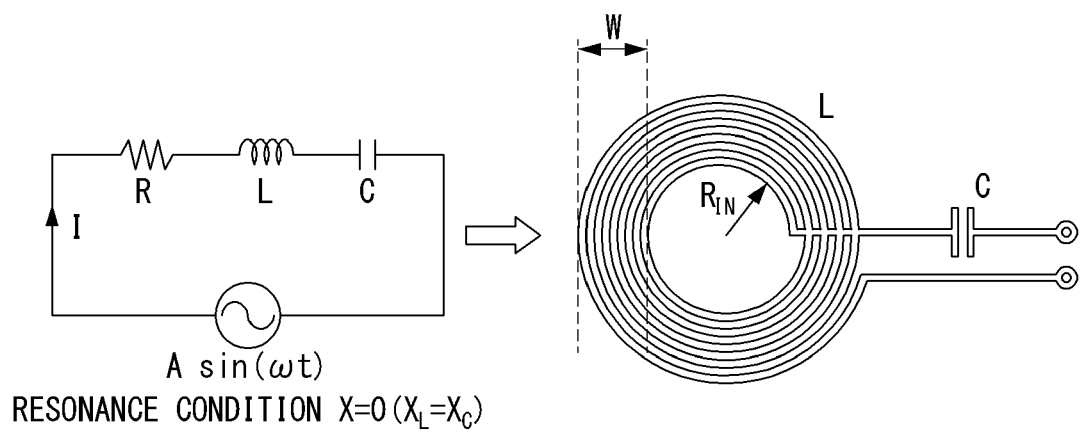
FIG. 1 is a conceptual diagram illustrating an embodiment of a resonant coil used in magnetic field communication.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

In particular, a communication system to which embodiments according to the present disclosure are applied may belong to a magnetic field communication technology for wirelessly transmitting information underground or underwater using communication in a high frequency band of several hundred MHz or more. The communication system to which the embodiments according to the present disclosure are applied may use a low frequency band of 100 kHz or less and may use a coil antenna of a loop structure in which a magnetic field occupies a majority for information transmission. The communication system to which the embodiments according to the present disclosure are applied relates to a resonator configuration for overcoming a fundamental narrow band problem of a small antenna in which resonance occurs in the case of a magnetic loop antenna and may include a description of a broadband technique utilizing a plurality of resonant coils.

In order to wirelessly transmit more information, bandwidths of modules or devices used for physical layers (e.g., antennas, transmission/reception filters, or amplifiers) belonging to a wireless channel may be the most important. For example, in order to transmit 10 Mbps information, in the case of amplitude shift keying (ASK) and binary phase shift keying (BPSK), a bandwidth of at least 8 MHz may be required. Since a region where a magnetic field is dominant is a near field and thus a signal is rapidly attenuated as a transmission distance increases, magnetic field communication may be used only in a very close region. A representative example of magnetic field communication may be a near field communication (NFC) technology. In the case of the NFC technology, wireless communication can be performed at a close communication distance of 20 cm or less. In the NFC technology, an antenna coil may have a non-resonant structure using a magnetic induction technology without using a resonance phenomenon. Therefore, it is possible to secure a necessary bandwidth without difficulty, but a transmission distance may be very short. Magnetic induction-based super-proximity magnetic field communication can extend the transmission distance by securing a broadband through a loop coil of a resonance structure.

Next, a method of securing a broadband in magnetic field communication will be described. In the case of a magnetic resonator, there may be a problem in that a bandwidth for application to communication is not secured due to a narrowband characteristic. A region around a frequency at which resonance occurs may have a characteristic of a very narrow bandwidth due to a high quality factor (Q) value. A method of combining a plurality of single resonant coils may be used to solve the narrowband problem. In the case of a resonant antenna, resonance may be performed to allow a sufficient current to flow in a coil. When the resonance is performed, an antenna having a very narrow bandwidth may be formed. Therefore, an important design parameter for securing a broadband may be a combination of resonators having different resonant frequencies for securing a maximum bandwidth and minimizing an overall antenna size.

FIG. 1 is a conceptual diagram illustrating an embodiment of a resonant coil used in magnetic field communication.

Referring to FIG. 1, an RLC circuit may be a circuit including a resistor R, an inductor or coil L, and a capacitor C. In order to allow resonance to occur in the RLC circuit, L and C should be present and an imaginary part jX of impedance should become zero. Complex impedance Z may be expressed as in Equation 1 below.

$$Z = R + jX = R + j\omega L + \frac{1}{j\omega C} \qquad \text{[Equation 1]}$$

A resonance frequency may be a frequency at which the imaginary impedance jX becomes zero in Equation 1. Accordingly, a resonance frequency f satisfying j X=0 may be expressed as in Equation 2 below.

$$resonance frequency = \frac{1}{2\pi\sqrt{LC}} \qquad \text{[Equation 2]}$$

In Equation 2, a resonator having a high Q value may be manufactured using a sufficient L value and parasitic capacitance C. As an example for allowing imaginary impedance to become zero in Equation 1, in the case of a device mainly formed of L, it may be necessary to additionally secure C to obtain resonance at a desired frequency.

Figure 2:
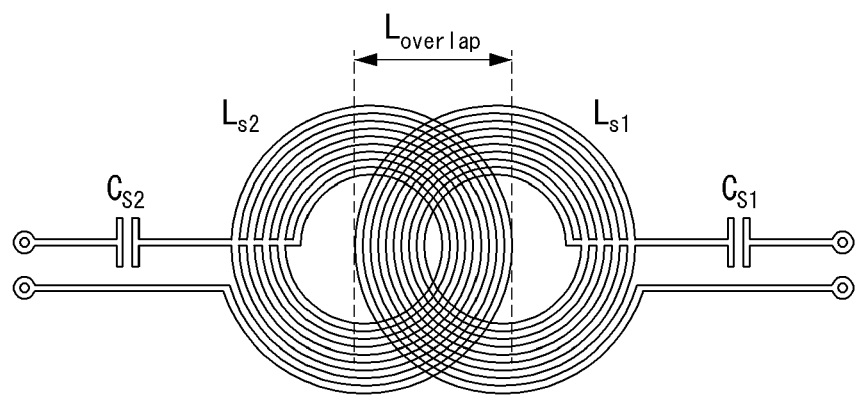
FIG. 2 is a conceptual diagram illustrating an embodiment of a structure of two coils having different resonant frequencies.

FIG. 2 is a conceptual diagram illustrating an embodiment of a structure of two coils having different resonant frequencies.

Referring to FIG. 2, a method of using a second resonator to obtain a different resonant frequency in a state in which resonance occurs at a desired frequency using a first resonator in FIG. 1 will be described. The first resonator may include a first coil $L_{S1}$ and a first capacitor $C_{s1}$, and the second resonator may include a second coil $L_{S2}$ and a second capacitor $C_{s2}$. The first resonator and the second resonator may be disposed to overlap each other, and a degree of overlap $L_{overlap}$ may be adjusted. Mutual inductance between the first and second resonators may be determined by the degree of overlap of the first and second resonators, and isolation between the first and second resonators may be determined by the mutual inductance.

Figure 3:
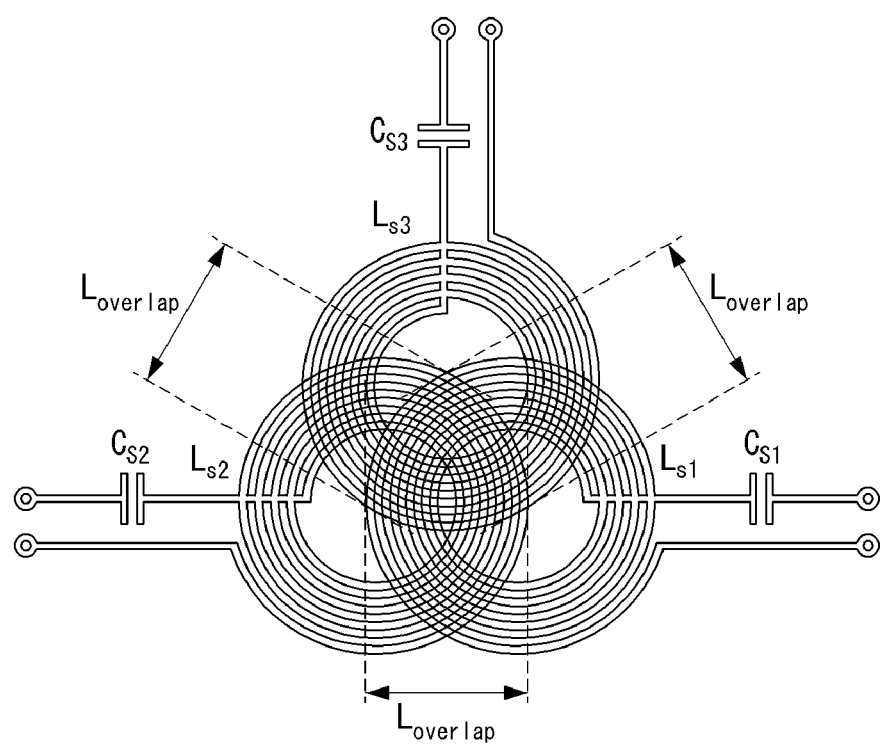
FIG. 3 is a conceptual diagram illustrating an embodiment of a structure of three coils having different resonant frequencies.

FIG. 3 is a conceptual diagram illustrating an embodiment of a structure of three coils having different resonant frequencies.

Referring to FIG. 3, in a state in which resonance occurs at different frequencies using the first resonator and the second resonator in FIG. 2, a method of using a third resonator to obtain another different resonant frequency will be described. The first resonator may include the first coil $L_{S1}$ and the first capacitor $C_{s1}$, the second resonator may include the second coil $L_{S2}$ and the second capacitor $C_{s2}$, and the third resonator may include a third coil $L_{S3}$ and a third capacitor $C_{s3}$. The first to third resonators may be disposed to overlap each other, and a degree of overlap therebetween may be adjusted.

Figure 4:
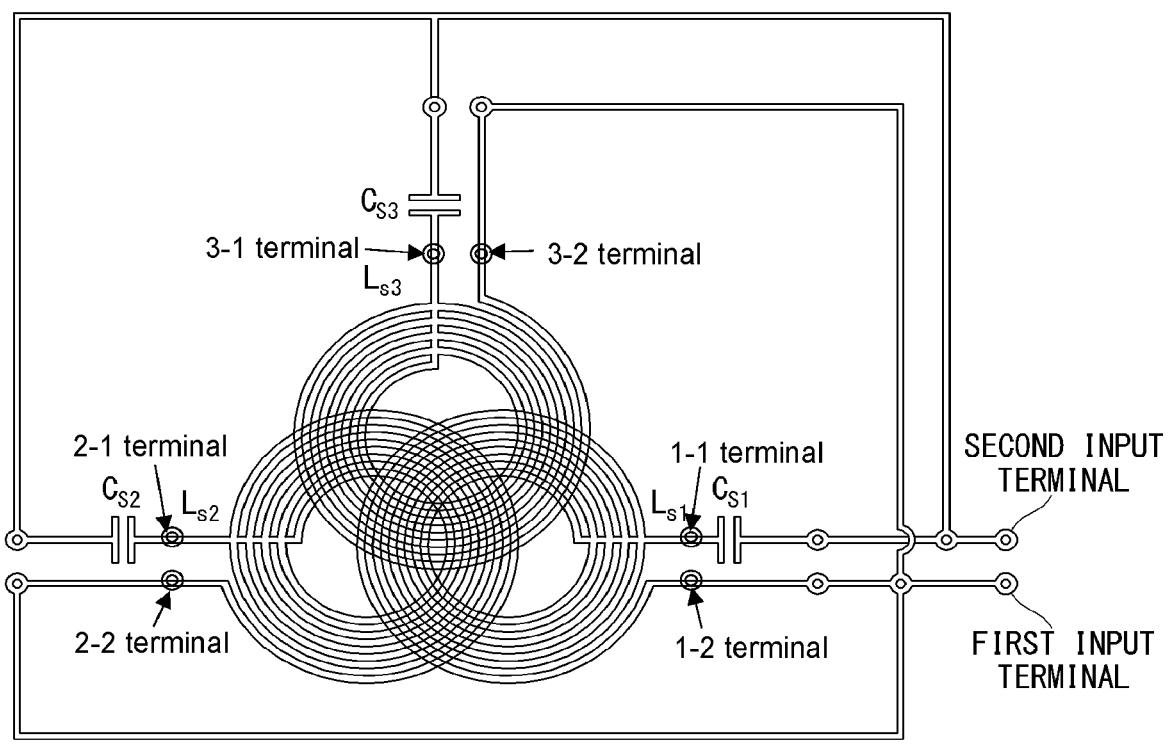
FIG. 4 is a conceptual diagram illustrating an embodiment of a loop antenna using three resonators having different resonant frequencies.

FIG. 4 is a conceptual diagram illustrating an embodiment of a loop antenna using three resonators having different resonant frequencies.

Referring to FIG. 4, one input port of resonators having different resonant frequencies may be formed by connecting terminals with and without capacitors to each other. Accordingly, one antenna port may be formed of a plurality of resonators having different resonant frequencies. More specifically, a first resonator may include a first coil $L_{S1}$ and a first capacitor $C_{s1}$, a second resonator may include a second coil $L_{S2}$ and a second capacitor $C_{s2}$, and a third resonator may include a third coil $L_{S3}$ and a third capacitor $C_{s3}$. A first end of the first coil $L_{S1}$ may be connected to the first capacitor $C_{s1}$, and the first capacitor $C_{s1}$ may be connected to a second input end of a port (e.g., an input port and/or an output port). A second end of the first coil $L_{S1}$ may be connected to a first input end of the port (e.g., the input port and/or the output port). A first end of the second coil $L_{S2}$ may be connected to the second capacitor $C_{s2}$, and the second capacitor $C_{s2}$ may be connected to a second input end of the port (e.g., the input port and/or the output port). A second end of the second coil $L_{S2}$ may be connected to the first input end of the port (e.g., the input port and/or the output port). A first end of the third coil $L_{S3}$ may be connected to the third capacitor $C_{s3}$, and the third capacitor $C_{s3}$ may be connected to the second input end of the port (e.g., the input port and/or the output port). A second end of the third coil $L_{S3}$ may be connected to the first input end of the port (e.g., the input port and/or the output port). When the port is the input port, the input port may include the first input terminal and the second input terminal. The first input terminal of the input port may be connected to the three coils included in the three resonators, and the second input terminal of the input port may be connected to the three capacitors included in the three resonators.

Figure 5A:
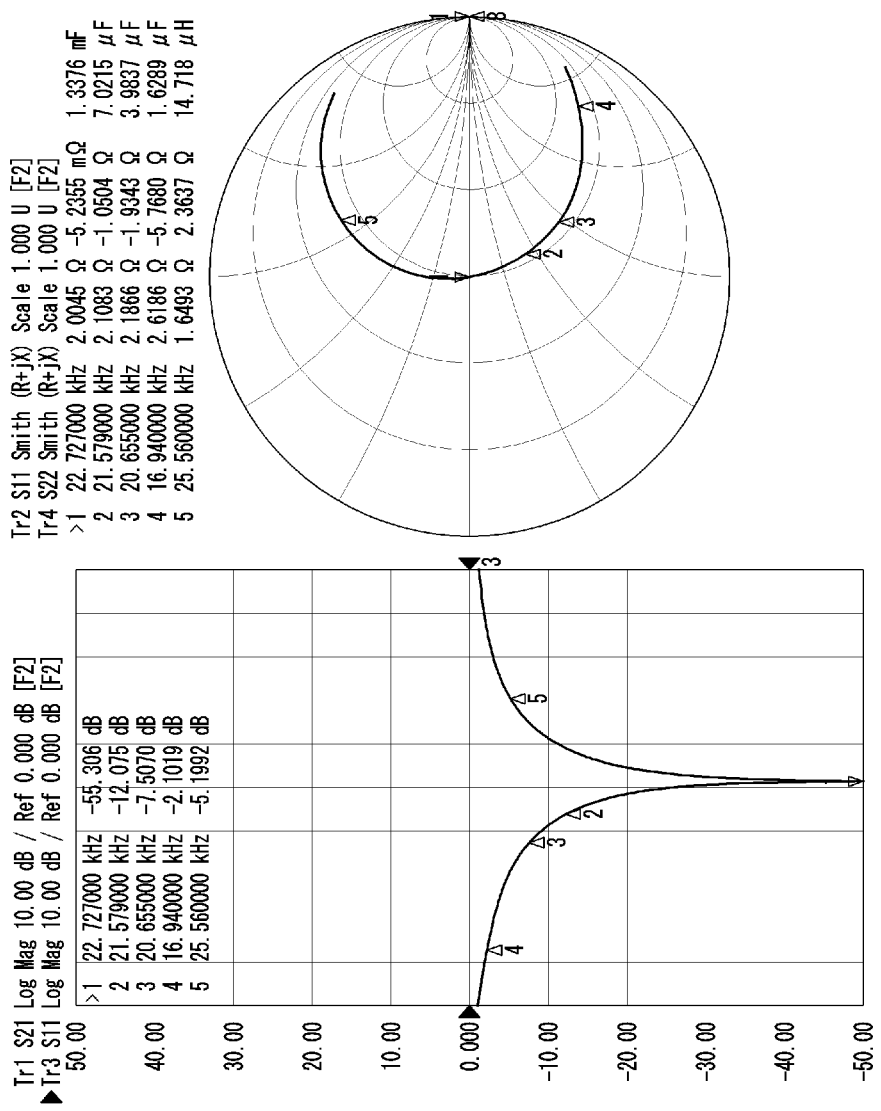
FIG. 5A is a conceptual diagram illustrating a 10 dB return loss bandwidth of the first resonator.

FIG. 5A is a conceptual diagram illustrating a 10 dB return loss bandwidth of the first resonator.

Referring to FIG. 5A, in the first resonator, a resonant frequency may be 22.727 kHz and a $BW_{10dB}$ may be 2.629 kHz. Inductance of an equivalent resonator may be 78.8 μH, and a capacitor having a capacitance of 620 nF may be connected to obtain the resonant frequency of 22.727 kHz.

Figure 5B:
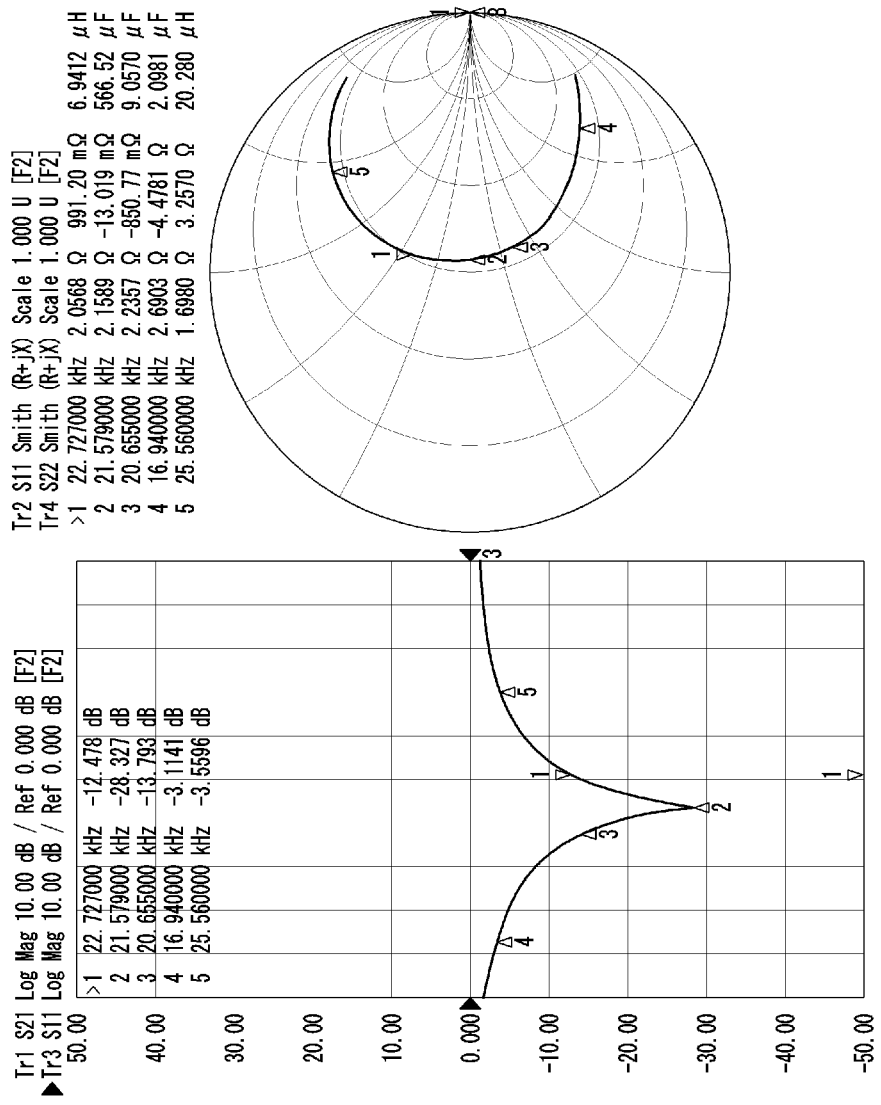
FIG. 5B is a conceptual diagram illustrating a 10 dB return loss bandwidth of the second resonator.

FIG. 5B is a conceptual diagram illustrating a 10 dB return loss bandwidth of the second resonator.

Referring to FIG. 5B, in the second resonator, a resonant frequency may be 21.579 kHz and a $BW_{10dB}$ may be 3.061 kHz. Inductance of an equivalent resonator may be 78.8 μH, and a capacitor having a capacitance of 620 nF may be connected to obtain the resonant frequency of 21.579 kHz.

Figure 5C:
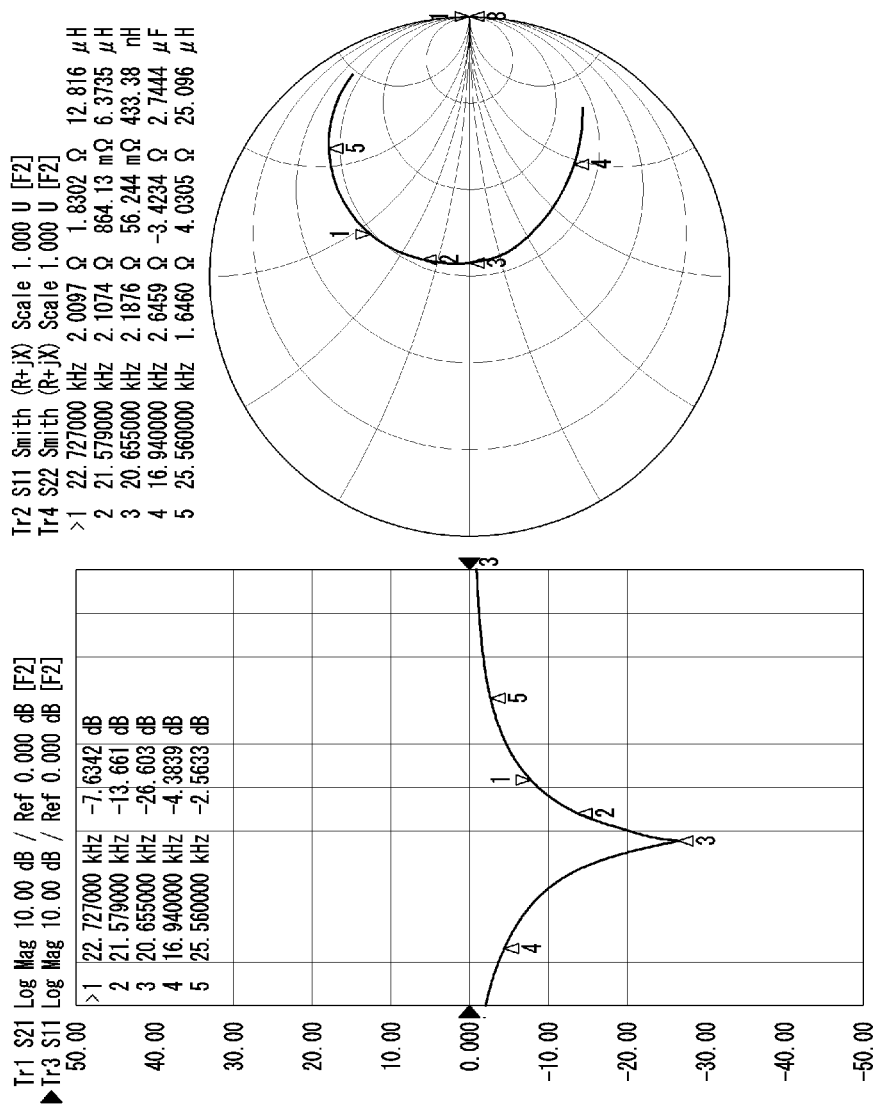
FIG. 5C is a conceptual diagram illustrating a 10 dB return loss bandwidth of the third resonator.

FIG. 5C is a conceptual diagram illustrating a 10 dB return loss bandwidth of the third resonator.

Referring to FIG. 5C, in the third resonator, a resonant frequency may be 20.655 kHz and a $BW_{10dB}$ may be 3.103 kHz. Inductance of an equivalent resonator may be 78.8 μH, and a capacitor having a capacitance of 755 nF may be connected to obtain the resonant frequency of 20.655 kHz. A method of obtaining a broadband resonant antenna using the first to third resonators in FIGS. 5A to 5C will be described below with reference to FIGS. 6A to 6D.

Figure 6A:
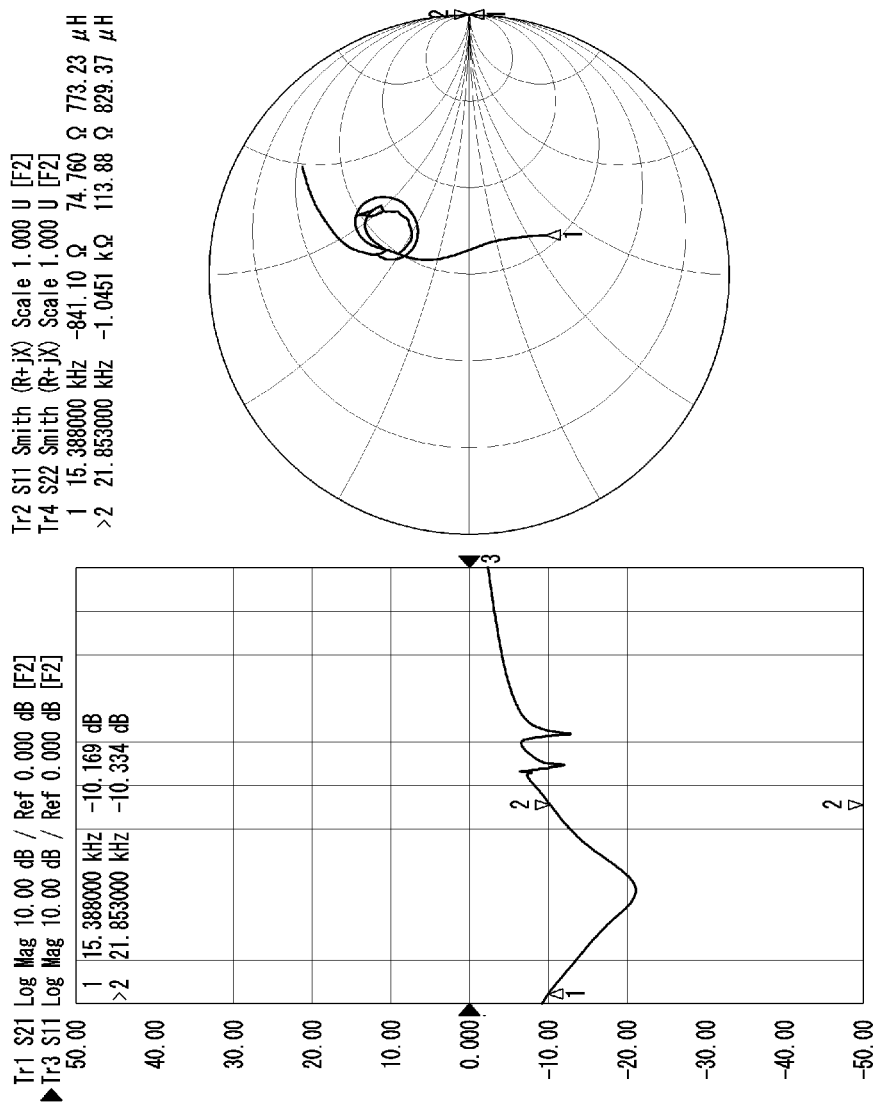
FIG. 6A is a conceptual diagram illustrating a first example of a bandwidth characteristic of a loop antenna according to a degree of overlap and isolation between resonators having different resonant frequencies.

FIG. 6A is a conceptual diagram illustrating a first example of a bandwidth characteristic of a loop antenna according to a degree of overlap and isolation between resonators having different resonant frequencies.

Referring to FIG. 6A, when the isolation between the first resonator and the second resonator is 10 dB, S21 (or S12) indicating a degree of coupling between the first resonator and the second resonator may mean −10 dB. When the isolation is large, the degree of coupling between the resonators may be reduced. The resonant frequencies of the three resonators constituting an antenna may be 22.727 kHz, 21.579 kHz, and 20.655 kHz, and the degree of overlap between the three resonators may be 85 mm. $f_1$ may be 15.388 kHz, $f_2$ may be 21.853 kHz, $BW_{10dB}$ may be 6.465 kHz, and a bandwidth extension ratio may be 2.11.

Figure 6B:
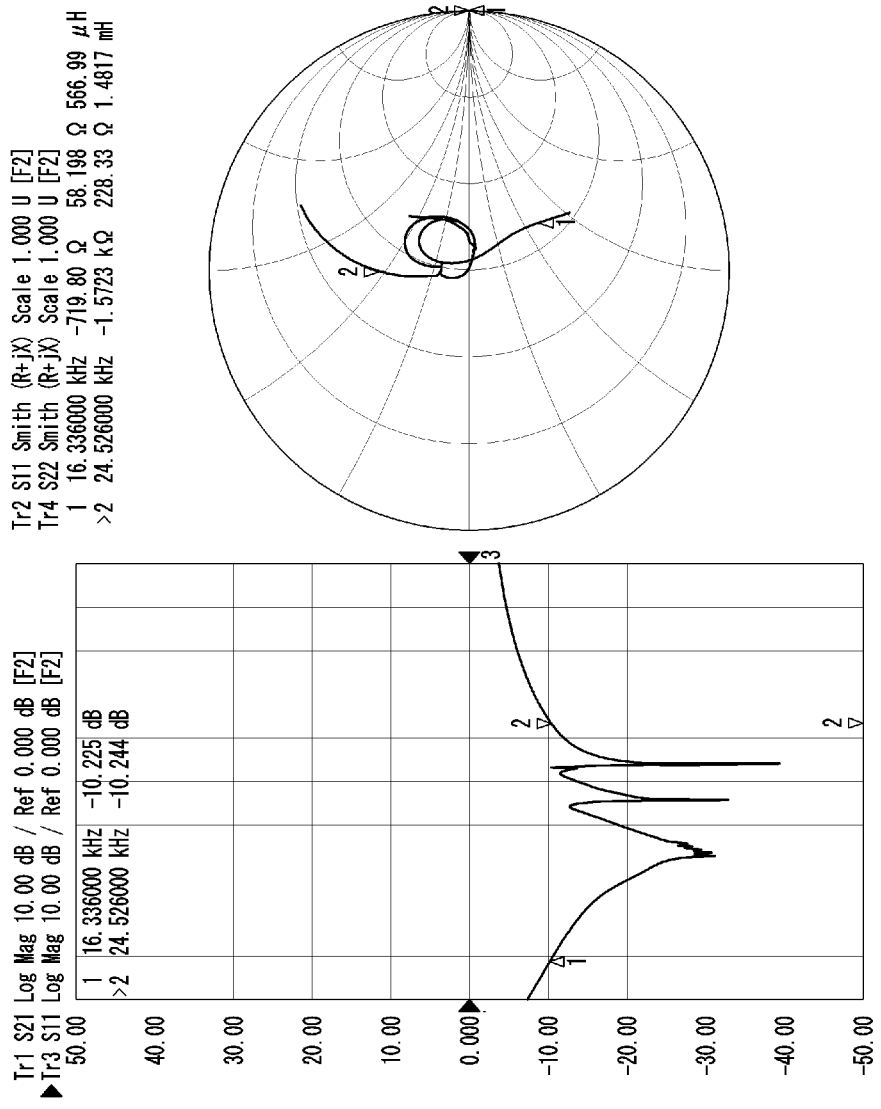
FIG. 6B is a conceptual diagram illustrating a second example of the bandwidth characteristic of the loop antenna according to the degree of overlap and the isolation between the resonators having different resonant frequencies.

FIG. 6B is a conceptual diagram illustrating a second example of the bandwidth characteristic of the loop antenna according to the degree of overlap and the isolation between the resonators having different resonant frequencies.

Referring to FIG. 6B, in the case in which the isolation between the first resonator and the second resonator is 20 dB, the resonant frequencies of the three resonators constituting an antenna may be 22.727 kHz, 21.579 kHz, and 20.655 kHz, and the degree of overlap between the three resonators may be 66 mm. $f_1$ may be 16.336 kHz, $f_2$ may be 24.526 kHz, $BW_{10dB}$ may be 8.19 kHz, and a bandwidth extension ratio may be 2.67.

Figure 6C:
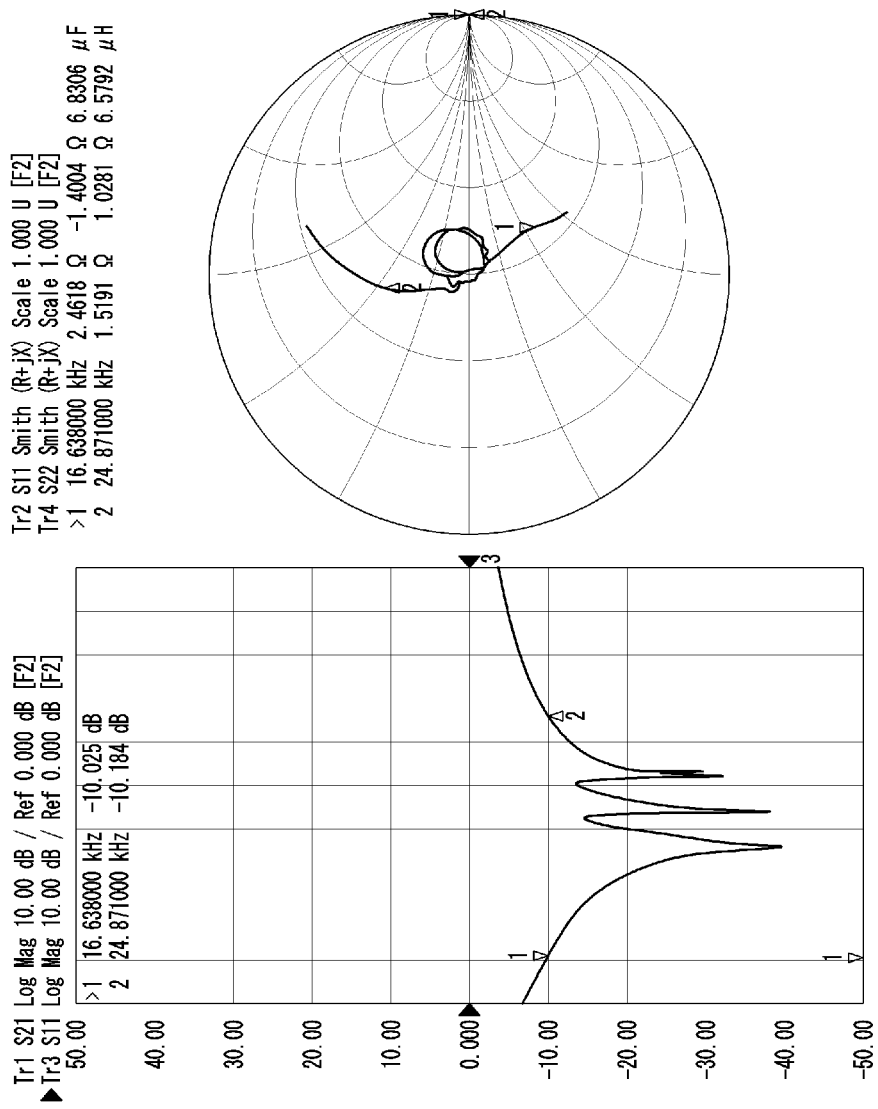
FIG. 6C is a conceptual diagram illustrating a third example of the bandwidth characteristic of the loop antenna according to the degree of overlap and the isolation between the resonators having different resonant frequencies.

FIG. 6C is a conceptual diagram illustrating a third example of the bandwidth characteristic of the loop antenna according to the degree of overlap and the isolation between the resonators having different resonant frequencies.

Referring to FIG. 6C, in the case in which the isolation between the first resonator and the second resonator is 30 dB, the resonant frequencies of the three resonators constituting an antenna may be 22.727 kHz, 21.579 kHz, and 20.655 kHz, and the degree of overlap between the three resonators may be 63 mm. $f_1$ may be 16.638 kHz, $f_2$ may be 24.871 kHz, $BW_{10dB}$ may be 8.233 kHz, and a bandwidth extension ratio may be 2.68.

Figure 6D:
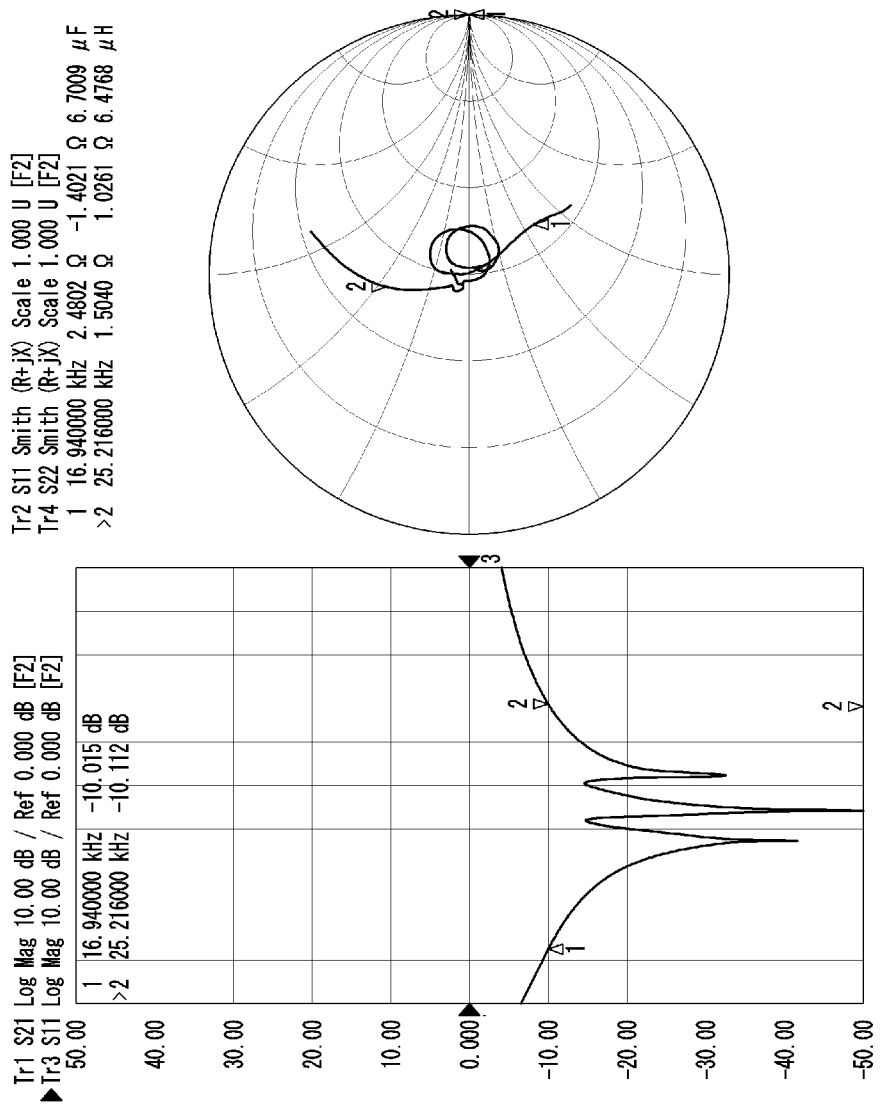
FIG. 6D is a conceptual diagram illustrating a fourth example of the bandwidth characteristic of the loop antenna according to the degree of overlap and the isolation between the resonators having different resonant frequencies.

FIG. 6D is a conceptual diagram illustrating a fourth example of the bandwidth characteristic of the loop antenna according to the degree of overlap and the isolation between the resonators having different resonant frequencies.

Referring to FIG. 6D, in the case in which the isolation between the first resonator and the second resonator is 40 dB, the resonant frequencies of the three resonators constituting an antenna may be 22.727 kHz, 21.579 kHz, and 20.655 kHz, and the degree of overlap between the three resonators may be 61 mm. $f_1$ may be 16.94 kHz, $f_2$ may be 25.216 kHz, $BW_{10dB}$ may be 8.276 kHz, and a bandwidth extension ratio may be 2.703.

Referring to FIGS. 6A to 6D again, the degree of overlap between the resonant coils may be formed to be decreased (e.g., from 85 mm to 61 mm). The degree of overlap between the resonator coils may be defined as a magnitude of the isolation between the resonators. That is, the isolation between the resonators may be determined by the degree of overlap between the resonators, and the isolation may be a coupling state between the first resonator and the second resonator, between the first resonator and the third resonator, and between the second resonator and the third resonator. The isolation of 10 dB may mean that the degree of coupling between the resonators is −10 dB.

When the isolation between the resonators is 10 dB, 20 dB, 30 dB, and 40 dB, the degree of overlap between the resonators may be 85 mm, 66 mm, 63 mm, and 61 mm. When the degree of overlap between the resonators is reduced to 85 mm, 66 mm, 63 mm, and 61 mm, a variance in bandwidth may be 6.465 kHz, 8.19 kHz, 8.233 kHz, and 8.276 kHz. Therefore, when the degree of overlap is reduced to 2.11 times, 2.67 times, 2.68 times, and 2.70 times an average bandwidth of one resonator, the isolation may be increased and the bandwidth may be widened. As the isolation between the resonators is increased, a uniformity characteristic of the bandwidth of the resonator can also be improved.

Figure 7A:
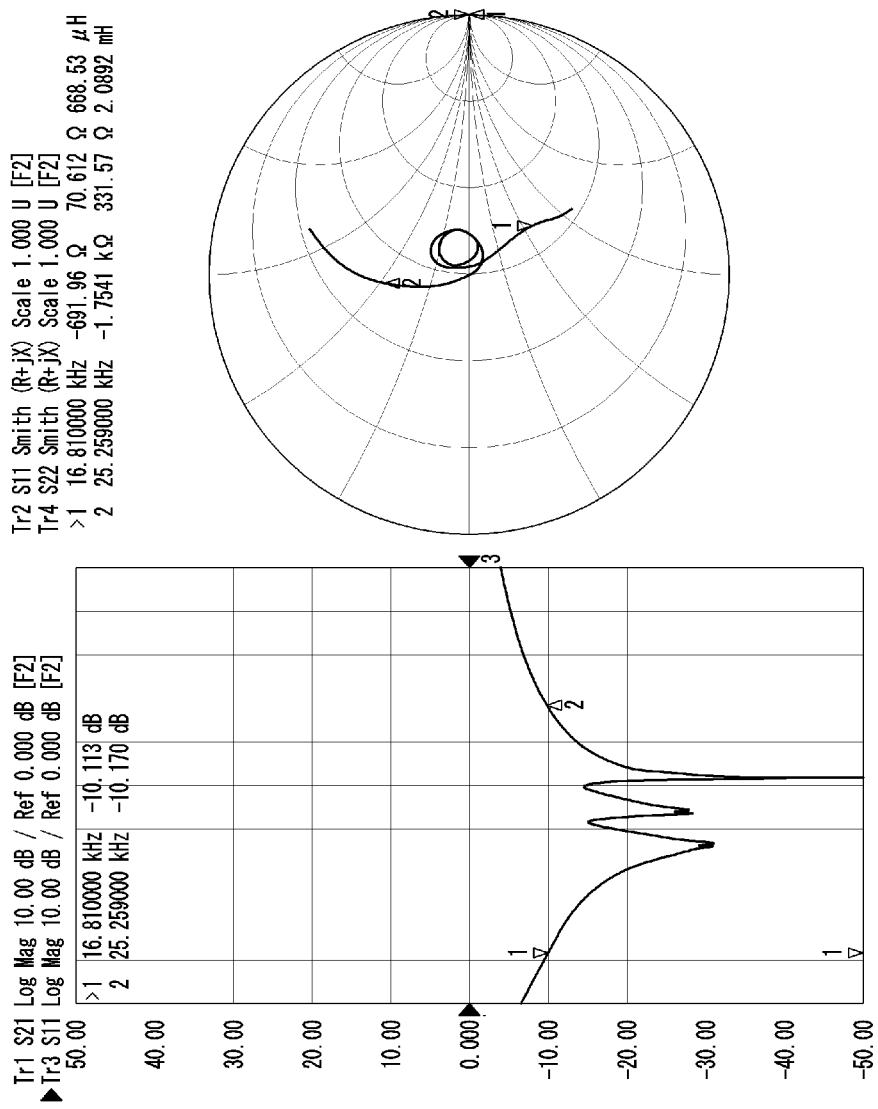
FIG. 7A is a conceptual diagram illustrating a fifth example of a bandwidth characteristic of a loop antenna according to a degree of overlap and isolation between resonators having different resonant frequencies.

FIG. 7A is a conceptual diagram illustrating a fifth example of a bandwidth characteristic of a loop antenna according to a degree of overlap and isolation between resonators having different resonant frequencies.

Referring to FIG. 7A, in the case in which the isolation between the first resonator and the second resonator is 55 dB, the resonant frequencies of the three resonators constituting an antenna may be 22.727 kHz, 21.579 kHz, and 20.655 kHz, and the degree of overlap between the three resonators may be 60 mm. $f_1$ may be 16.81 kHz, $f_2$ may be 25.259 kHz, $BW_{10dB}$ may be 8.45 kHz, and a bandwidth extension ratio may be 2.76.

Figure 7B:
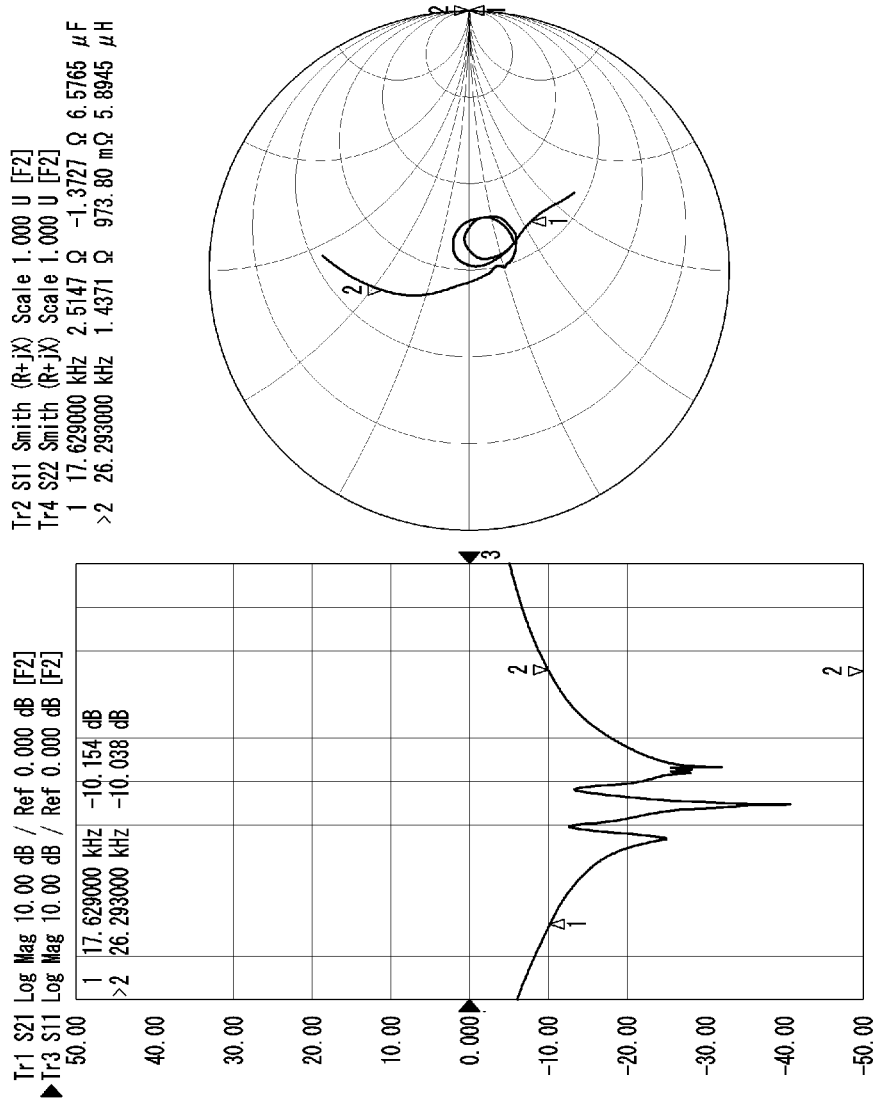
FIG. 7B is a conceptual diagram illustrating a sixth example of the bandwidth characteristic of the loop antenna according to the degree of overlap and the isolation between the resonators having different resonant frequencies.

FIG. 7B is a conceptual diagram illustrating a sixth example of the bandwidth characteristic of the loop antenna according to the degree of overlap and the isolation between the resonators having different resonant frequencies.

Referring to FIG. 7B, in the case in which the isolation between the first resonator and the second resonator is 20 dB, the resonant frequencies of the three resonators constituting an antenna may be 22.727 kHz, 21.579 kHz, and 20.655 kHz, and the degree of overlap between the three resonators may be 53 mm. $f_1$ may be 17.629 kHz, $f_2$ may be 26.293 kHz, $BW_{10dB}$ may be 8.664 kHz, and a bandwidth extension ratio may be 2.83.

Figure 7C:
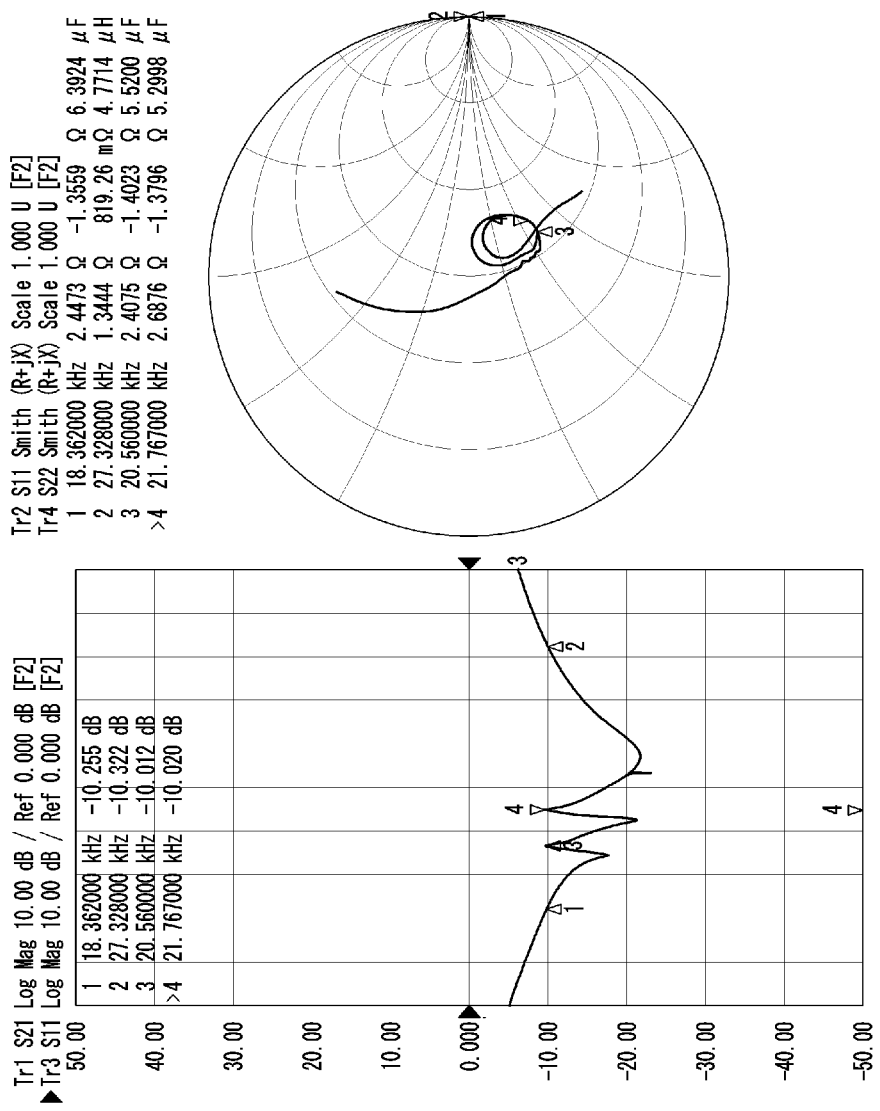
FIG. 7C is a conceptual diagram illustrating a seventh example of the bandwidth characteristic of the loop antenna according to the degree of overlap and the isolation between the resonators having different resonant frequencies.

FIG. 7C is a conceptual diagram illustrating a seventh example of the bandwidth characteristic of the loop antenna according to the degree of overlap and the isolation between the resonators having different resonant frequencies.

Referring to FIG. 7C, in the case in which the isolation between the first resonator and the second resonator is 12 dB, the resonant frequencies of the three resonators constituting an antenna may be 22.727 kHz, 21.579 kHz, and 20.655 kHz, and the degree of overlap between the three resonators may be 30 mm. $f_1$ may be 21.767 kHz, $f_2$ may be 27.328 kHz, $BW_{10dB}$ may be 5.561 (or 8.966), and a bandwidth extension ratio may be 1.816 (or 2.929).

Referring to FIGS. 7A to 7C again, the degree of overlap between the resonant coils may be formed to be decreased (e.g., from 60 mm to 30 mm). When the degree of overlap between the resonators is decreased to 60 mm, the isolation may be as much as 55 dB, and the degree of coupling between the resonators may be close to zero. When the degree of overlap between the resonators is further reduced, the isolation may be decreased and the degree of coupling may be increased.

When the degree of overlap between the resonators is 60 mm, the isolation may have a maximum magnitude, the bandwidth may be 8.45 kHz, and a maximum bandwidth extension ratio may be 2.76. When the degree of overlap between the resonators is reduced to 53 mm and 30 mm, the isolation between the resonators may be 20 dB and 12 dB, and the bandwidth may be secured to be wider than in a case in which the degree of overlap between the resonators is 60 mm. However, when the degree of overlap between the resonators is 30 mm, the bandwidth may actually be narrowed due to a characteristic that a reflection coefficient value rises toward 10 dB in the middle. Therefore, the optimal loop antenna structure may be a case in which the isolation between the resonators is 55 dB which is the largest value.

Figure 8A:
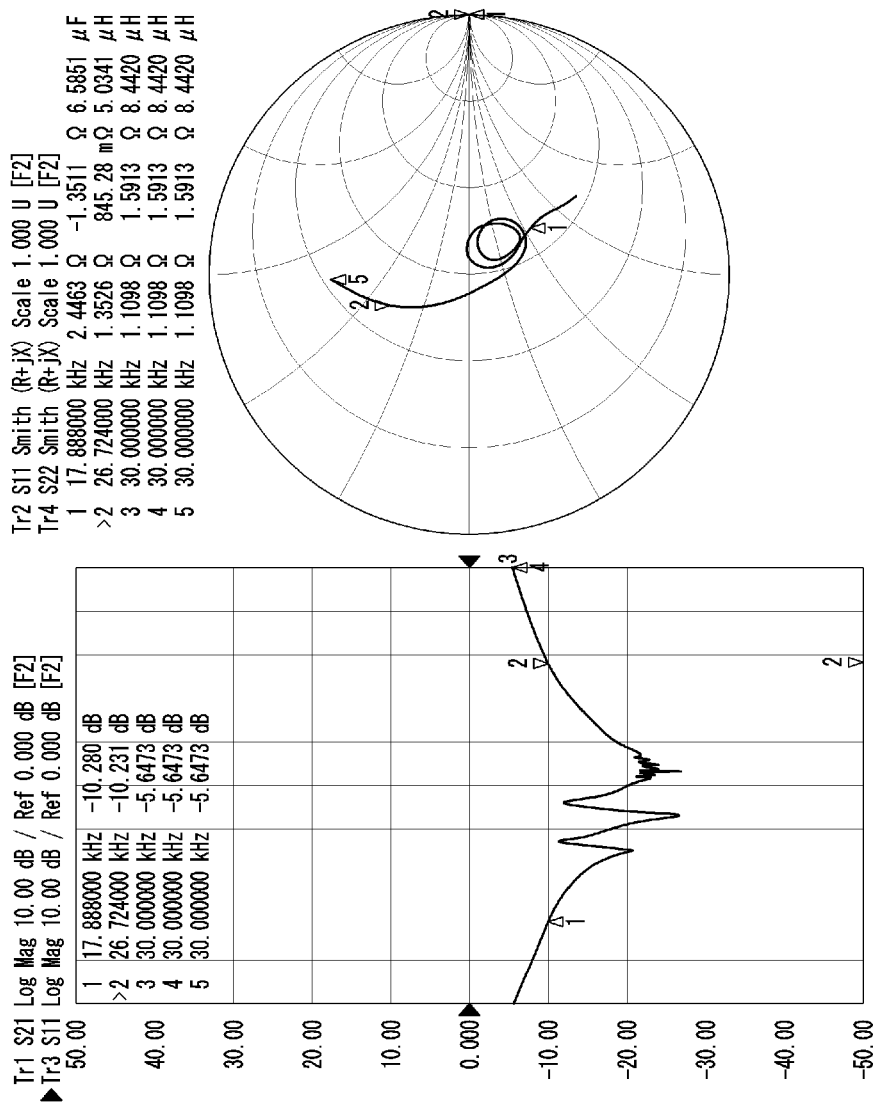
FIG. 8A is a conceptual diagram illustrating an eighth example of a bandwidth characteristic of a loop antenna according to a degree of overlap and isolation between resonators having different resonant frequencies.

FIG. 8A is a conceptual diagram illustrating an eighth example of a bandwidth characteristic of a loop antenna according to a degree of overlap and isolation between resonators having different resonant frequencies.

Referring to FIG. 8A, in the case in which the isolation between the first resonator and the second resonator is 14 dB, the resonant frequencies of the three resonators constituting an antenna may be 22.727 kHz, 21.579 kHz, and 20.655 kHz, and the degree of overlap between the three resonators may be 43 mm. $f_1$ may be 17.888 kHz, $f_2$ may be 26.724 kHz, $BW_{10dB}$ may be 8.836 kHz, and a bandwidth extension ratio may be 2.88.

Figure 8B:
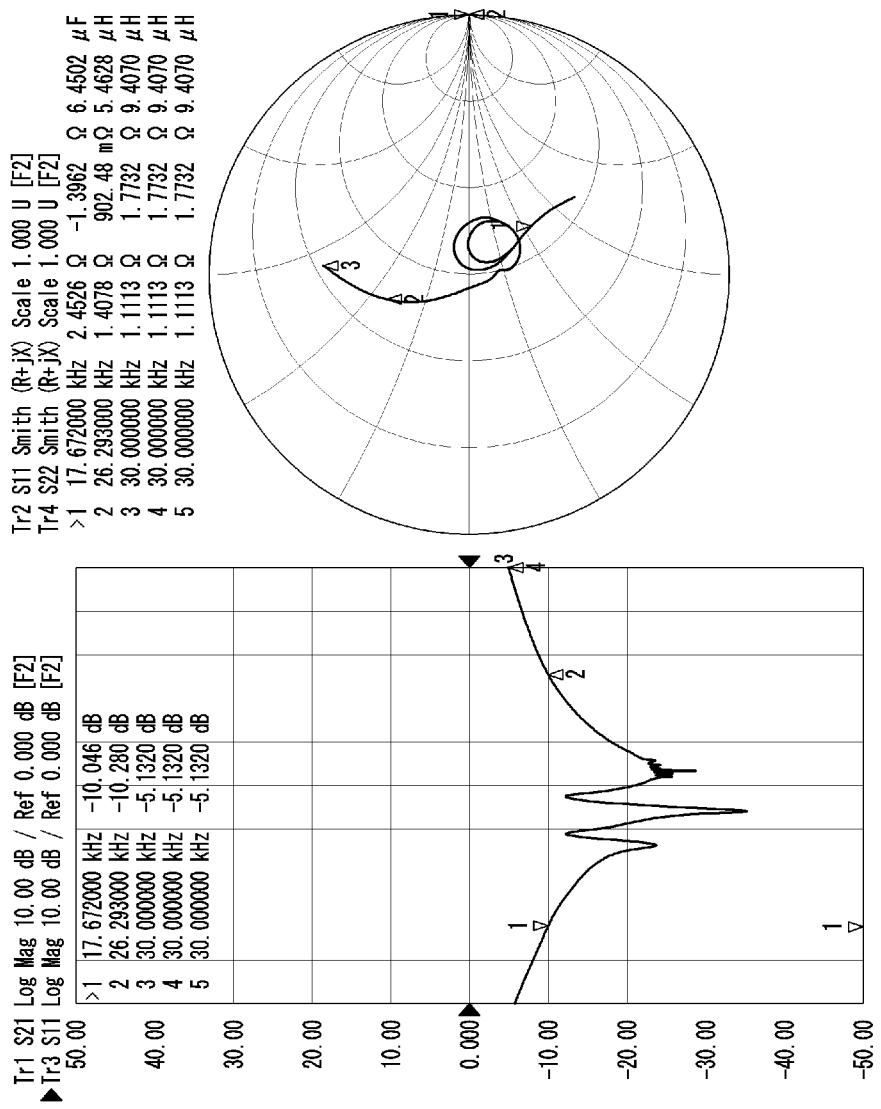
FIG. 8B is a conceptual diagram illustrating a ninth example of the bandwidth characteristic of the loop antenna according to the degree of overlap and the isolation between the resonators having different resonant frequencies.

FIG. 8B is a conceptual diagram illustrating a ninth example of the bandwidth characteristic of the loop antenna according to the degree of overlap and the isolation between the resonators having different resonant frequencies.

Referring to FIG. 8B, in the case in which the isolation between the first resonator and the second resonator is 18 dB, the resonant frequencies of the three resonators constituting an antenna may be 22.727 kHz, 21.579 kHz, and 20.655 kHz, and the degree of overlap between the three resonators may be 58 mm. $f_1$ may be 17.672 kHz, $f_2$ may be 26.293 kHz, $BW_{10dB}$ may be 8.621 kHz, and a bandwidth extension ratio may be 2.81.

Referring to FIGS. 8A and 8B again, the degree of overlap between the resonators may be formed to be increased again (i.e., away from each other between the coils). Referring to FIG. 7C again, a case in which the degree of overlap between the resonators is 30 m is a case in which the degree of overlap between the resonators is minimum, and thus each coil portion may have a completely overlapping structure so that in FIGS. 8A and 8B, a distance between the resonators is increased, and thus the degree of overlap may be increased again. Referring to FIG. 8B again, when the degree of overlap between the resonators is 58 mm or more, there may be no overlap between the resonators and an appropriate bandwidth may be secured, but a return loss value within the bandwidth may be close to 10 dB.

Figure 9A:
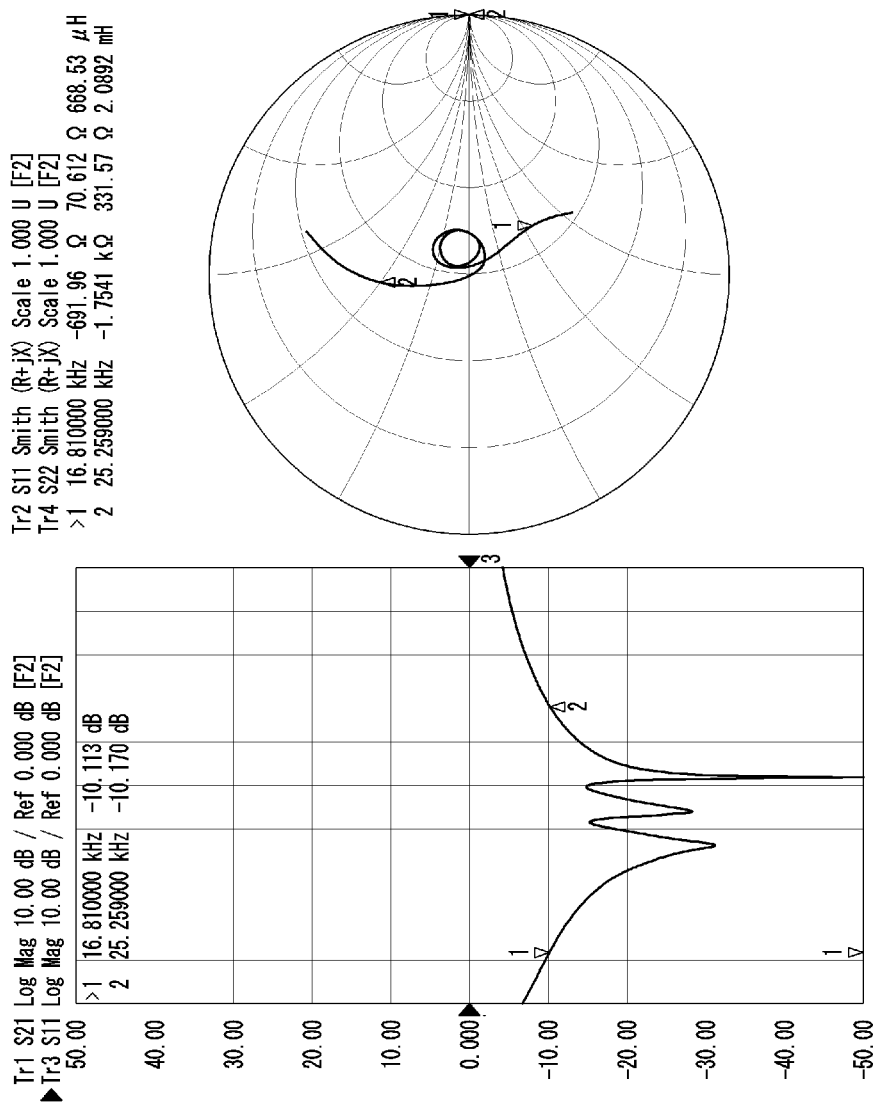
FIG. 9A is a conceptual diagram illustrating a first example of a bandwidth characteristic of a loop antenna when the isolation between the resonators is 55 dB.

FIG. 9A is a conceptual diagram illustrating a first example of a bandwidth characteristic of a loop antenna when the isolation between the resonators is 55 dB.

Referring to FIG. 9A, in the case in which the isolation between the first resonator and the second resonator is 55 dB, the resonant frequencies of the three resonators constituting an antenna may be 22.727 kHz, 21.579 kHz, and 20.655 kHz, and the degree of overlap between the three resonators may be 60 mm. $f_1$ may be 16.81 kHz, $f_2$ may be 25.259 kHz, $BW_{10dB}$ may be 8.45 kHz, and a bandwidth extension ratio may be 2.76.

Figure 9B:
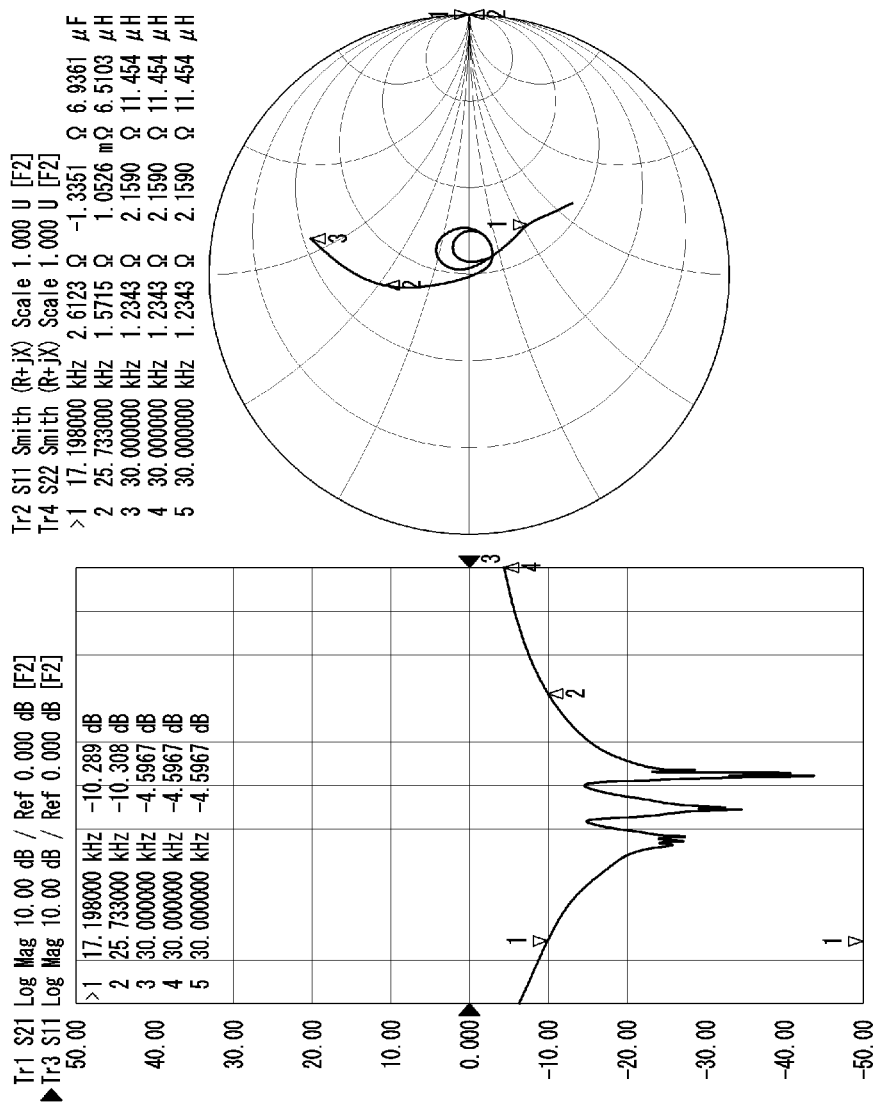
FIG. 9B is a conceptual diagram illustrating a second example of the bandwidth characteristic of the loop antenna when the isolation between the resonators is 55 dB.

FIG. 9B is a conceptual diagram illustrating a second example of the bandwidth characteristic of the loop antenna when the isolation between the resonators is 55 dB.

Referring to FIG. 7B, in the case in which the isolation between the first resonator and the second resonator is 55 dB, the resonant frequencies of the three resonators constituting an antenna may be 22.727 kHz, 21.579 kHz, and 20.655 kHz, and the degree of overlap between the three resonators may be 433 mm. $f_1$ may be 17.198 kHz, $f_2$ may be 25.733 kHz, $BW_{10dB}$ may be 8.535 kHz, and a bandwidth extension ratio may be 2.78.

Referring to FIGS. 9A and 9B again, antennas may have the same bandwidth characteristic when the isolation between the resonators is 55 dB (e.g., FIG. 7A) and when the distance between the resonators is 433 mm. The same bandwidth characteristic may mean that the bandwidths of the antenna are the same when an overall size of the antenna is reduced and when the distance between the resonators is increased to obtain sufficient isolation. Therefore, in order to obtain an optimal antenna bandwidth, an arrangement of the resonators for obtaining maximum isolation may mean a method of forming an antenna to have an optimal antenna bandwidth FIG. 10 is a conceptual diagram illustrating one example of a wideband small loop antenna design for magnetic field communication.

Figure 10:
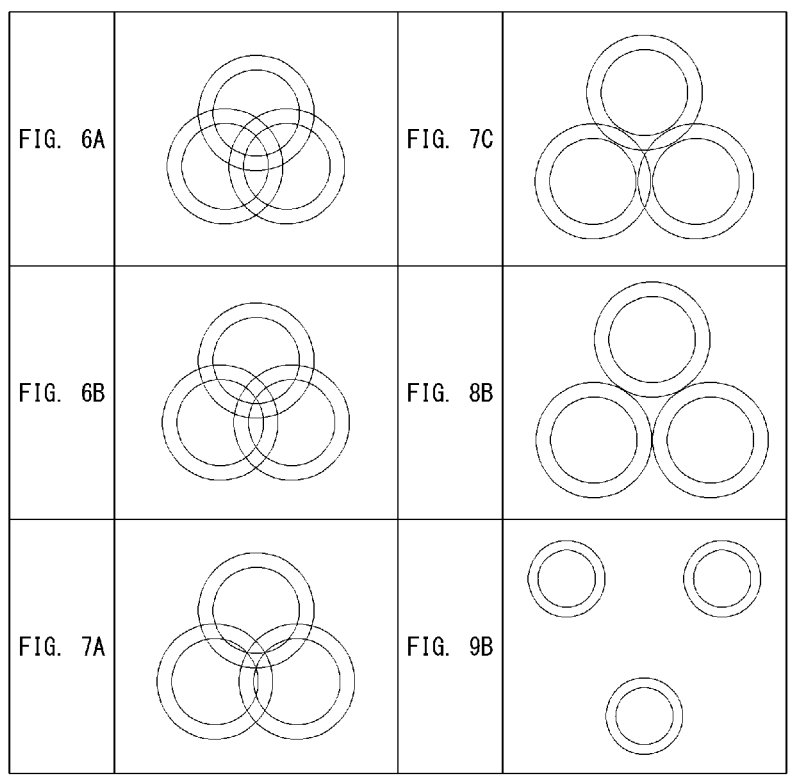
FIG. 10 is a conceptual diagram illustrating one example of a wideband small loop antenna design for magnetic field communication.

FIG. 10 shows actual shapes of loop antennas using an arrangement of resonators having different resonant frequencies used in an actual experiment (e.g., the loop antennas of FIGS. 6A, 6B, 7A, 7C, 8B, and 9B). However, FIG. 10 shows one example of a loop antenna configuration through three resonators, and since the loop antenna may be configured in the same manner even when two or more resonators are used, the present disclosure is not limited to the example shown in FIG. 10.

In the shapes of the loop antennas of FIGS. 7A and 9B, it can be seen that the bandwidth characteristics may be the same and there is a clear difference in size between the loop antennas. The loop antenna of FIG. 7A has the largest isolation, and a mutual coupling coefficient between the resonators may have a minimum value. That is, this may mean that the coupling coefficient from the first resonator to the second resonator, from the first resonator to the third resonator, or from the second resonator to the third resonator is minimum. However, the above-described coupling coefficient between the resonators may not be varied according to a coupling order between the resonators. The resonators in the present embodiment may have a loop shape in which a coil is wound in a spiral structure. However, the present embodiment is not limited to the spiral structure, but may be applied to a loop antenna having any structure, and may also be applied to a printed circuit board (PCB) having a multilayer (or stacked) structure which is a substrate type.

FIG. 11 is a flowchart illustrating an embodiment of a broadband small loop antenna design process for magnetic field communication.

Referring to FIG. 11, an apparatus may design a wideband small loop antenna through a wideband small loop antenna design process for magnetic field communication. The apparatus may include at least one processor and a memory which stores one or more commands executed by a corresponding processor. The processor may execute program commands stored in the memory. The memory may be formed as at least one of a volatile storage medium and a non-volatile storage medium. For example, the memory may be formed as at least one of a read only memory (ROM) and a random access memory (RAM).

A degree of overlap and isolation between resonators may be varied according to shapes of the resonators in a process of manufacturing a wideband small antenna of a loop structure for magnetic field communication. Referring to FIG. 1 again, a structure in which isolation is minimized according to an inner diameter $R_{IN}$ of a resonator and a thickness W of a coil may be different for each resonator. The isolation may be different according to types of the resonators. The apparatus may form resonant coils having different resonant frequencies, find a structure in which the isolation is minimized in the combination of the formed resonant coils, and broaden a bandwidth of the loop antenna by checking a bandwidth.

The apparatus may check positions of the resonators in a standby state (S1301 and S1302). The apparatus may adjust a distance between the resonators to be close (S1303). As the distance between the resonators becomes closer, the degree of overlap between the resonators may be reduced. Alternatively, the apparatus may adjust a distance between the resonators to be increased (S1304). As the distance between the resonators is increased, the degree of overlap between the resonators may be increased. In operations S1303 and S1304, the apparatus may detect isolation values between the resonators according to the degree of overlap between the resonators (S1305). When a predetermined maximum value (e.g., 55 dB) is not derived among the detected isolation values, the apparatus may return to the operation (e.g., operation S1302) of checking the positions of the resonators again (S1306). When the predetermined maximum value (e.g., 55 dB) is detected among the detected isolation values, the apparatus may check whether an antenna configuration having maximum isolation has an optimal bandwidth (S1307). Here, the optimal bandwidth may mean that a reflection coefficient value rises toward 10 dB so that a bandwidth narrowing characteristic does not appear. When the antenna configuration having the maximum isolation does not have the optimal bandwidth, the apparatus may return to the operation of checking the positions of the resonators (i.e., S1302) again (S1308). When the antenna configuration having the maximum isolation has the optimal bandwidth, the apparatus may determine that the wideband small loop antenna is completed (S1309).

FIG. 12 is a conceptual diagram illustrating an embodiment of medium and long-distance magnetic field communication using a wideband small loop antenna.

Referring to FIG. 12, a system for magnetic field communication underwater or underground is illustrated. The magnetic field communication may use a switching amplifier of a voltage amplifier structure, and when a used frequency is about 100 kHz, a matching network may not be required. In particular, the switching amplifier has an output impedance of 1 ohm or 2 ohms. In the case of an LC series resonator, because input impedance of the antenna is very low, a matching circuit may not be required. The above description may be similarly applied to an output terminal. Underwater or underground, electromagnetic losses are very high, and thus a signal may not reach. When the wideband small loop antenna according to the above-described embodiments is used, since a magnetic field is mainly formed, the wideband small loop antenna can be an advantageous communication part in a near-field region where a magnetic field is dominant.

According to the present disclosure, a resonant loop antenna can be miniaturized through resonators having different resonant frequencies, and a narrowband problem can be solved through the resonant loop antenna. In addition, since a broadband is secured, a transmission distance can be extended in near magnetic field communication in underwater or underground magnetic field communication environments. Accordingly, the performance of a magnetic field communication system can be improved.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An antenna device for magnetic field communication, comprising:
    a first coil;
    a second coil;
    a third coil;
    a first capacitor connected to a 1-1 terminal of the first coil;
    a second capacitor connected to a 2-1 terminal of the second coil;
    a third capacitor connected to a 3-1 terminal of the third coil; and
    an input port including a first input terminal and a second input terminal,
        the first input terminal being connected to a 1-2 terminal of the first coil, a 2-2 terminal of the second coil, and a 3-2 terminal of the third coil, with no capacitor between the first input terminal and each of the 1-2, 2-2, and 3-2 terminals, and
        the second input terminal being connected to the first capacitor, the second capacitor, and the third capacitor,
    wherein the first coil and the first capacitor form a first resonator, the second coil and the second capacitor form a second resonator, the third coil and the third capacitor form a third resonator, the first to third coils are disposed to overlap each other, and isolation between the first to third resonators is determined according to a degree of overlaps between the first to third coils.

2. The antenna device of claim 1, wherein the overlaps between the first to third coils are in a parallel form.

3. The antenna device of claim 1, wherein the first to third resonators have different resonant frequencies.

4. The antenna device of claim 1, wherein the isolation between the first to third resonators is determined according to inner diameters and thicknesses of the first to third coils.

5. The antenna device of claim 1, wherein the first to third resonators are disposed such that the isolation between the first to third resonators becomes maximum and the degree of overlaps between the first to third resonators becomes maximum.

6. The antenna device of claim 1, wherein an input impedance of the input port has any one value among 1 to 5 ohms.

7. The antenna device of claim 1, wherein each of the first to third coils has any one structure of a multilayer printed circuit board (PCB) or a stacked structure.

* * * * *